Nov. 25, 1958  J. D. RAMSAY  2,861,610
PORK CUTTING AND DEPOSITING MACHINE
Filed Dec. 13, 1954  4 Sheets-Sheet 1
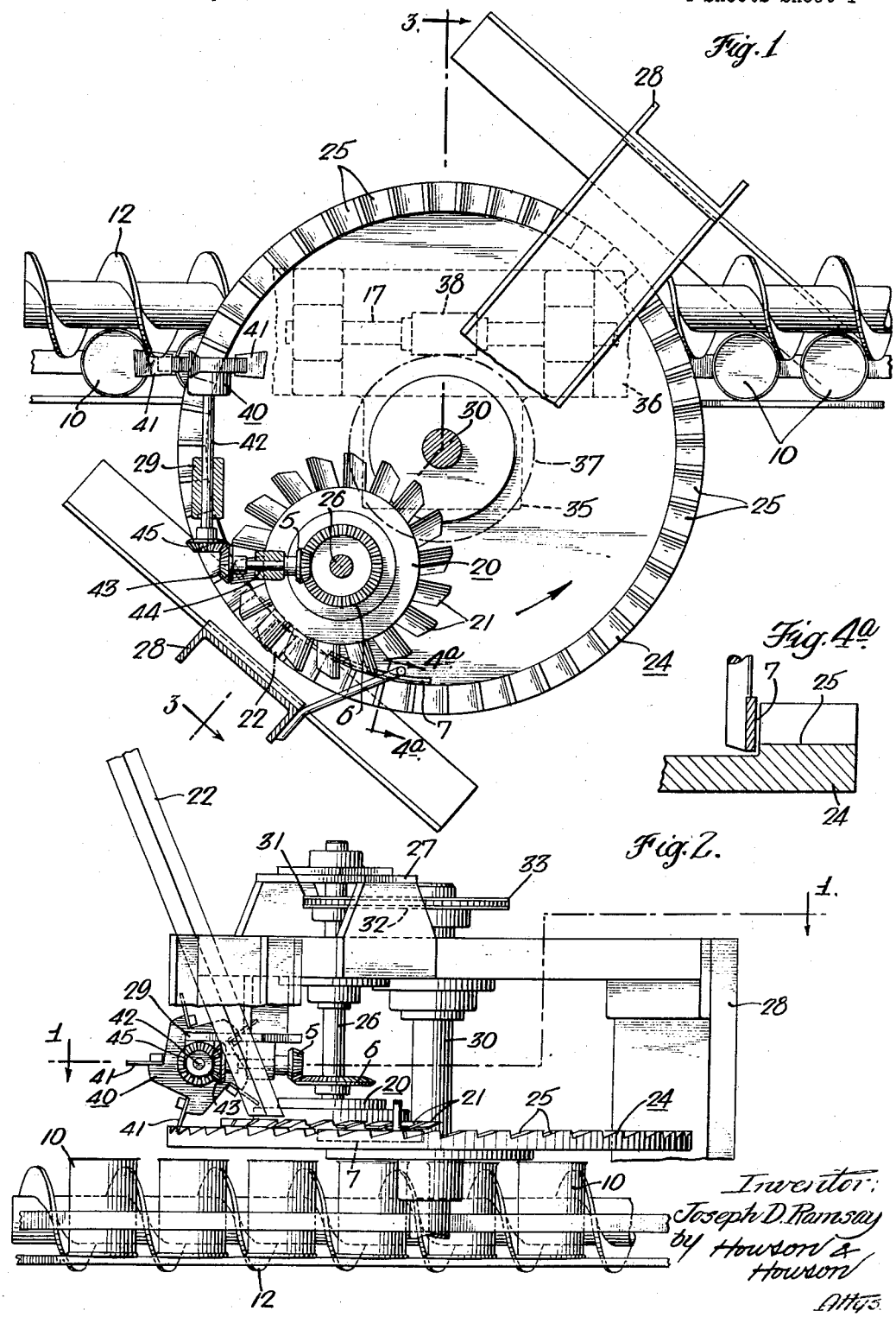

Nov. 25, 1958   J. D. RAMSAY   2,861,610
PORK CUTTING AND DEPOSITING MACHINE
Filed Dec. 13, 1954   4 Sheets-Sheet 2

Inventor:
Joseph D. Ramsay
by Howson & Howson
Attys.

Inventor:
Joseph D. Ramsay
by Howson & Howson
Attys.

Nov. 25, 1958   J. D. RAMSAY   2,861,610
PORK CUTTING AND DEPOSITING MACHINE
Filed Dec. 13, 1954   4 Sheets-Sheet 4
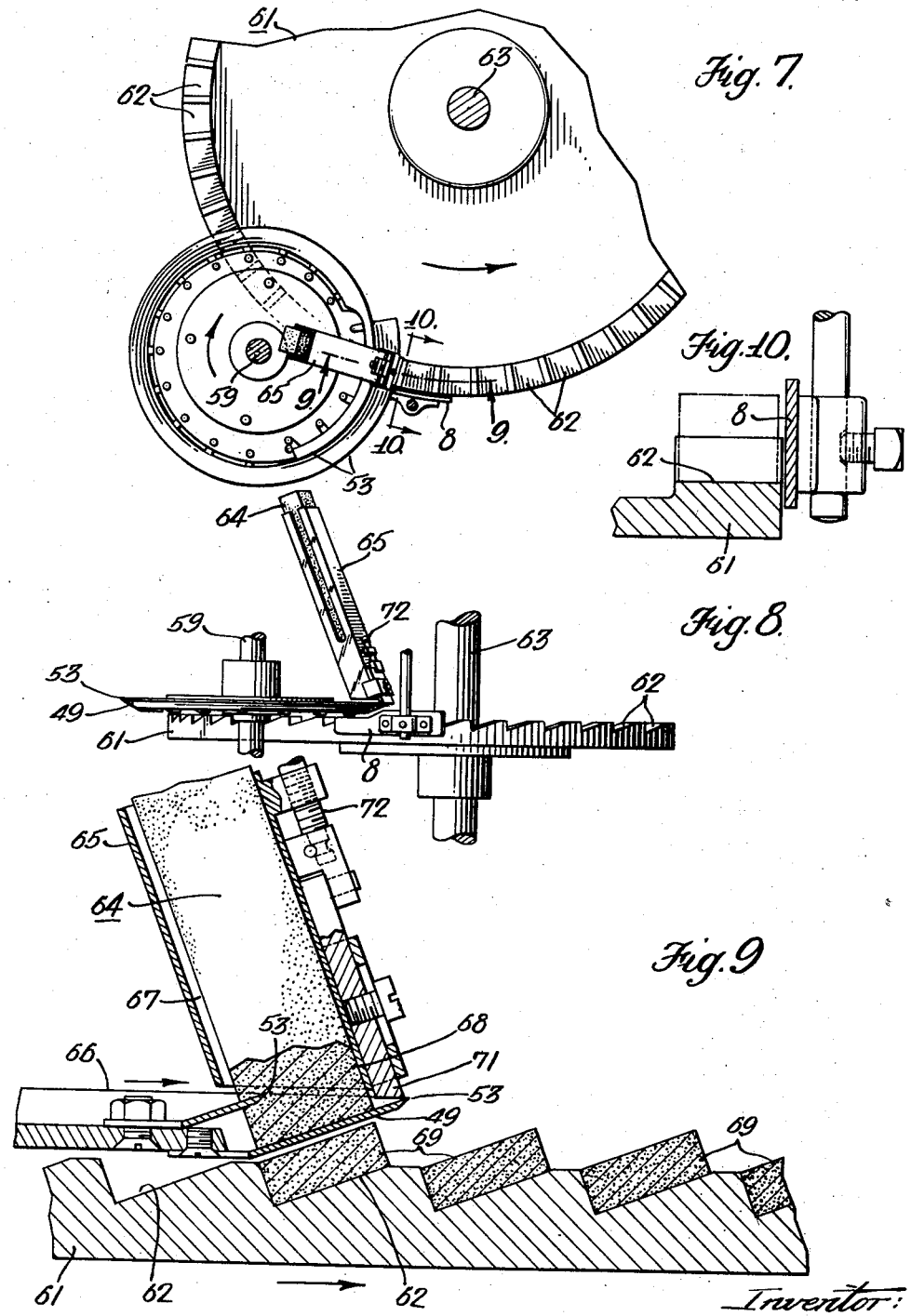
Inventor:
Joseph D. Ramsay
by Howson & Howson
Attys.

United States Patent Office 2,861,610
Patented Nov. 25, 1958

2,861,610

PORK CUTTING AND DEPOSITING MACHINE

Joseph Douglas Ramsay, Audubon, N. J., assignor to Campbell Soup Company, Camden, N. J., a corporation of New Jersey Application December 13, 1954, Serial No. 474,815

12 Claims. (Cl. 146—114)

The present invention relates generally to the canning of food products and more particularly to a machine for cutting an edible solid into pieces of predetermined size and shape and for depositing such pieces respectively into cans. By way of illustration the invention is shown as applied to a pork product in the canning of pork and beans.

An object of the invention is to provide an improved machine for cutting chips from a bar of pork, conveying such chips in succession to a point of discharge, and depositing the chips at said point into cans conducted successively into position to receive the discharged chips.

Another object is to provide a machine wherein a plurality of cutting, conveying and discharging instrumentalities coact in precisely timed relation to sever chips from a bar of pork and to deposit them successively into cans moving at high speed in a predetermined path.

Still another object is to provide a machine of the stated character comprising a novel precision chip cutting and conveying device permitting operation of the machine at high rates of speed.

A further object of the invention is to provide a machine of the aforesaid characteristics which will also afford ample time and opportunity for inspection of the chips before they are deposited in the cans.

The invention resides also in certain novel mechanical and structural details hereinafter described and illustrated in the attached drawings, wherein:

Fig. 1 is a sectional plan view of a pork cutting machine constructed in accordance with the invention, the section being taken as indicated by the line 1—1 of Fig. 2;

Fig. 2 is a front elevational view of the machine;

Fig. 4a is an enlarged fragmentary sectional view on the line 4a—4a, Fig. 1;

Figs. 7 and 8 are respectively fragmentary sectional plan and side elevational views showing on a reduced scale the essential elements of the preferred embodiment;

Fig. 9 is an enlarged developed sectional view similar to Fig. 4 illustrating the functional characteristics of said embodiment, and Fig. 10 is an enlarged fragmentary sectional view on the line 10—10, Fig. 7.

Figure 3:
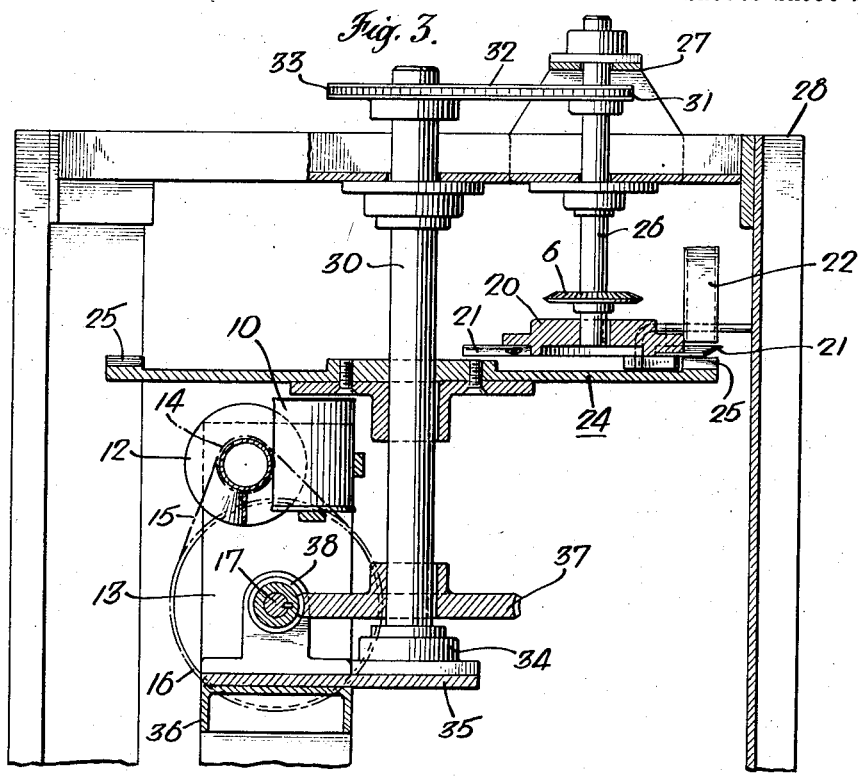
Fig. 3 is a vertical section taken on the line 3—3 of Fig. 1.
Figure 4:
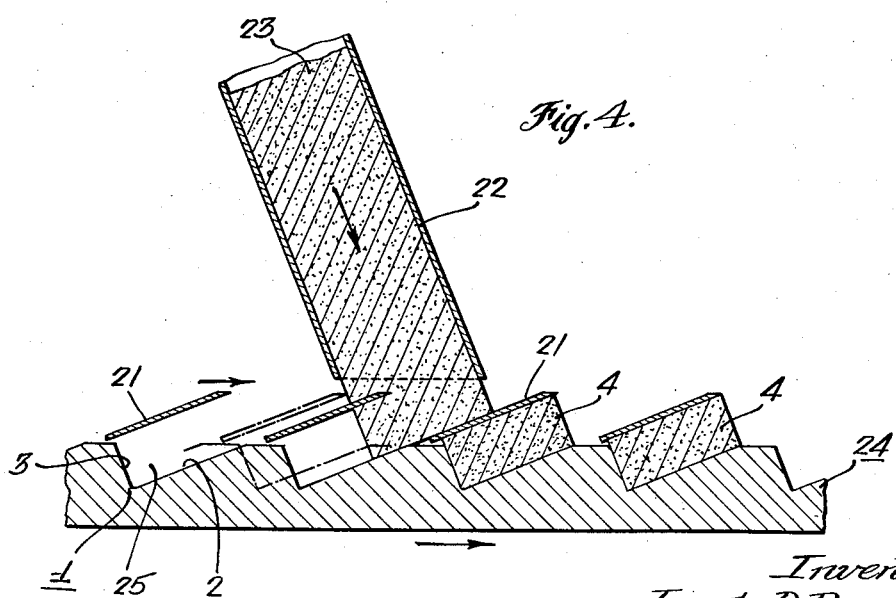
Fig. 4 is an enlarged developed sectional view illustrating the action of the precision cutting and conveying device forming an important feature of the machine.

In the embodiment of the invention shown in Figs. 1 and 4 of the drawings, and by way of illustration of the principle of the invention, cans 10 are conducted by a feed worm 12 in a predetermined linear path and at a predetermined speed. The worm also maintains the cans in predetermined spaced relation in said path. In the present instance the arrangement is such that as each can reaches a given point or station in said path, it receives a chip of pork discharged from a disc conveyor 24 located above the worm and hereinafter described in detail. The feed worm 12 is journalled at its ends in a suitable frame 13 for rotation about a horizontal axis, and is driven by sprocket 14 through the medium of a chain 15 and sprocket 16 on a drive shaft 17. The ratio of the sprockets is such as to feed the cans at high speed, for example as will cause the cans to pass the station at approximately three hundred per minute, the can feed forms an associated element of the invention which includes also the means for cutting pork chips from a parent bar of pork conveying the chips to the cans in a manner to afford opportunity for chip inspection, and depositing the chips individually into the cans.

For cutting pork chips to the desired size, a rotary cutting unit is provided, comprising a circular head 20, having a plurality of radially arranged projecting knives 21 lying in the same horizontal plane but each disposed at an angle to that plane with the cutting edge in elevated position. The path of travel of the cutting edges of the knives 21 is in close proximity to the lower end of a chute 22 in which a bar 23 of pork is fed downward into the path of the knives as the cutting unit rotates. The lower or rear edges of the knives 21 travel in a plane just above and parallel to the upper face of a rotary conveyor, in the form of a pallet disc 24, having a circumferential series of chip-receiving pockets 25. The pockets 25 are in the nature of V-shaped recesses in the upper surface of the disc 24, the bottom 1 of the V defining a radial line with respect to the vertical axis of the disc. The leading side 2 of the recess with respect to direction of disc rotation has the same angularity to the plane of the disc as the knives 21, and the trailing side 3 of the recess is normal to the plane of the leading side. When, therefore, one of the blades overlies a recess as in Fig. 4, it forms with the latter a rectangular pocket inclined rearwardly, the forward elevated side of which is open to receive a pork chip severed from the bar 23 by the blade. The chute 22 also is inclined to the plane of the disc with the longitudinal axis of the chute forming the same angle with the plane of the disc 24 as the trailing sides of the recesses. Thus, from any one of the recesses which may at the moment be intersected by the axis of the chute, the latter will extend upwardly in direction normal to the said leading side of the recess, and also to the knife which overlies the recess. The relationship of the elements is clearly shown in Fig. 4.

As shown in Fig. 1, the cutter head 20 is of relatively small diameter with respect to the disc 24, and the head and disc are rotated in such timed relation and are so relatively positioned that as any given recess 25 in the disc moves into position below the delivery end of the chute 22, a knife blade 21 will move into position above the recess. The relative positions of the recess and overlying blade at the moment the cutting edge of the blade meets the pork bar 23 is shown in broken lines in Fig. 4. The blade not only cuts the bar but simultaneously progressively draws the bar downwardly as the terminal lower end of the bar enters the pocket, so that the completely severed chip 4 has the desired substantially rectangular form conforming accurately to the shape of the pocket and the lower end of the bar is left in position for engagement by the succeeding knife blade. If the bar of pork or other work material lacks adequate inherent firmness and stiffness, these properties may be conferred by freezing the material.

In this way the chips in the cutting operation are securely established in the pockets in which they remain undisturbed as the knife blades moving on the relatively small circumference of the head 20 are retracted from pockets and chips which are carried away from and in advance of the knife blade from the cutting station along the greater circumference of the carrier disc. Any tendency of the chip to adhere to or be displaced laterally by the blade from the pocket may be neutralized by a guard band 7 adjoining the inside of the conveyor pockets in the area of the cutting station, as shown for example in Figs. 1 and 4a.

For supporting and operating the cutting unit, a vertical shaft 26 is suspended from and journalled in a bracket 27 as a part of a fixed frame 28, here shown, as extending above the pallet disc 24 and serving also to journal the upper projecting end of a shaft 30 to which the disc 24 is keyed. Motion is transmitted from the shaft 30 to the knife shaft 26 by a sprocket and chain drive, including a sprocket 31 on the shaft 26, a chain 32 and a sprocket 33 on the disc shaft 30. As so suspended and journalled the knives rotate in a path which in part is aligned with the path of the disc pockets 25.

The lower end of the shaft 30 is journalled in a step bearing 34 fixed to a bracket 35 carried by the lower brace 36 of the frame 28. A driven gear 37 on the shaft 30 is in mesh with a worm gear 38 on the extended journalled end of the motor shaft 17. The disc 24 mounted on the shaft 30 as described overlies the worm 12 so that the pockets 25 move at one point transversely thereacross or approximately at right angles to the path of movement of the cans with the can conveyor worm. As each chip reaches this point it is ejected radially outward from the pocket which it occupies and into a can then in position to receive it. The discharge station at which this ejection occurs lies at a point only slightly in advance of the cutting station so that a long arc of the conveyor disc is afforded for inspection of the chips on the disc before ejection.

As a means for ejecting the chips successively at the discharge station, a rotary brush-off wheel 40 is provided having a circumferential series of radially projecting fingers 41 arranged to move into brush-off position precisely at the instant that a chip reaches the ejection station. The wheel 40 is fixed to a driven shaft 42, journalled in a bracket 29 attached to the frame 28, and receives its motion from a gear 43 on a stub shaft 44 which engages a gear 45 on the driven shaft. The stub shaft 44 carries a pinion 5 which meshes with a gear 6 on the cutter shaft 26.

The brush-off wheel 42 rotates in a vertical plane which coincides with the path of travel of the cans, and the operation of the wheel is in timed relation with the operations of the conveyor disc and the can conveyor worm so that as each of the pockets 25 intersects the aforesaid vertical plane a finger of the brush-off wheel will sweep the contained pork fragment from the pocket and into the open top of a can which at the moment has been advanced by the conveyor worm into position to receive the said fragment.

The operation of the machine will be apparent from the foregoing description. Since the several operating elements of the machine are rotary in character, the machine is susceptible to high speed operation. Reciprocatory parts have been avoided. The novel cutting and chip conveying device contributes materially to the high speed characteristic of the machine in that it affords complete control of the severed chips from the moment of separation of the chips from the parent bar to subsequent deposition in the can. This device, which also functions automatically to advance the bar into the path of the blades to the precise extent required for uniform chip production, also eliminates necessity for separate feeding devices. Extreme simplicity of mechanical structure and operation is a desirable characteristic of the machine.

Figure 5:
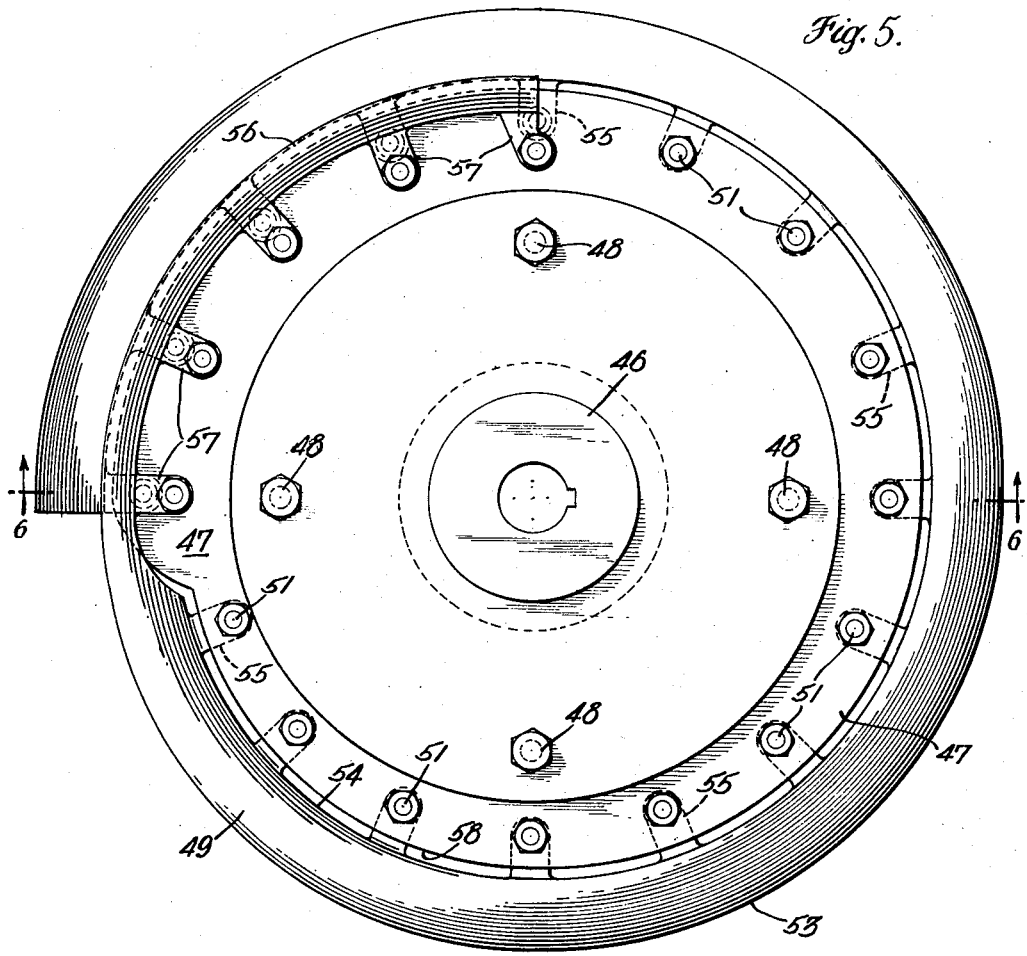
Fig. 5 is a top plan view of a modified form of cutter utilized in a preferred embodiment of the invention.
Figure 6:
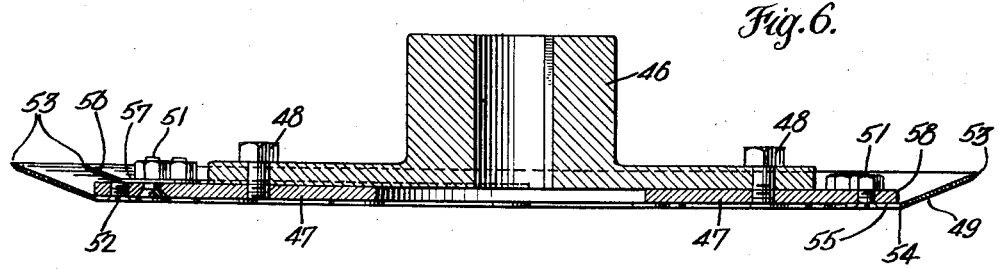
Fig. 6 is a sectional view on the line 6—6, Fig. 5.

In the preferred embodiment of the invention illustrated in Figs. 5 to 9 inclusive of the drawings, I employ a single rotary cutter blade in place of the multiple blade cutter unit described above and illustrated in Figs. 1 to 4. The blade structure illustrated in Figs. 5 and 6 comprises a central hub 46 adapted for attachment to the blade shaft, an annular blade-carrying rim portion 47 secured by screws 48 to the underside of the hub 46, and the cutting blade itself, identified by the reference numeral 49, which is secured by bolts 51 and screws 52 to the rim element 47. As shown in Fig. 5, the blade 49 is generally spiral in form, and in the present instance embraces an angle of approximately 450° around the axis of the hub 46. The peripheral edge 53 of the blade constitutes the cutting edge and also describes a spiral around the said axis in a plane normal to the latter. Also, as shown in Fig. 6, the body of the blade is dished and inclines away from the cutting edge 53 with respect to the plane of said edge. At its lower or inner peripheral edge 54, the blade is provided with a series of radial lugs 55 which underlie the rim 47 and are secured to the latter by the bolts 51. As stated, the cutting edge 53 occupies a plane normal to the axis of the hub 46, and the lugs 55 are parallel to that plane. In the overlapping portion 56 of the blade, the blade, or the portion thereof of lesser radius, is somewhat narrower than the other portions of the blade body so that in this part of the blade the securing lugs 57 at the inner periphery may be secured against the upper surface of the rim 47. It will be noted also by reference to Fig. 5 that the rim 47 itself varies in the radial dimension so that its outer edge 58 describes an approximate spiral substantially parallel to the spiral of the cutting edge 53.

In the machine, the blade described above is mounted on a shaft 59 and immediately overlies one side of a rotary conveyor or pallet disc 61 which corresponds substantially to the conveyor disc 24 of the previously described embodiment. In this case the shaft 59 of the cutter lies outside of the periphery of the conveyor disc and may therefore if desired extend downwardly below the plane of the conveyor for connection to a suitable source of power. The upper surface of the conveyor disc 61, which confronts the underside of the cutter, is provided with pockets 62 in peripheral series which correspond to the pockets 25 of the previously described embodiment, the bottom surfaces of the pockets when at the cutting station paralleling the proximate part of the inclined blade body. The rotary conveyor 61 is mounted on a vertical shaft 63, and in this instance the strip of work material, designated in Fig. 9 by the reference numeral 64, is directed to the cutting blade from above in a plane substantially normal to the plane of the conveyor and tangential to the median line of the peripheral series of pockets 62 and within the plane at an angle substantially normal to the cutting blade at the instant of cutting. This is indicated in broken lines in Fig. 7 wherein the guide for the work strip is indicated by the reference numeral 65. At the point where the cutting edge 53 meets the work strip therefore the said edge is moving in a direction approximately at right angles to said plane, and at the same time the cutting edge by reason of its spiral formation is advancing into the work strip in the aforesaid tangential direction with respect to the series of pockets 62. The resulting action is a slicing one which is highly effective to cleanly and rapidly sever the end portions of the work strip directed downwardly to the blade in the guide 65.

The relation of the cutter to the work material and to the guide 65 through which the work material is directed longitudinally to the cutting station is best shown in Fig. 9 of the drawings. The cutting edge of the blade rotates in the plane indicated by the line 66, and the cutting action of the blade by reason of the spiral formation is both longitudinal and in the direction indicated by the arrow from the inner side 67 of the work strip to the outer side 68. The cut is initiated by the portion of the cutting edge 53 of lesser radius, and terminates in the portion of greater radius and by reason of the blade overlap the severed sections of work material are never released from blade support until the next cut has been initiated. By reason of its inclination, the blade acts as a cam to advance the work strip in the guide longitudinally so that the actual plane of cut in the work strip is parallel to the blade body or at right angles to the longitudinal axis of the strip, instead of in the plane 66 of the cutting edge 53. Thus in each revolution of the blade 49 a section of uniform thickness will be cut from the end of the work piece, and will be deposited in the underlying pocket 62 of the conveyor 61. Such severed ends are illustrated in Fig. 9 and are therein indicated by the reference numeral 69. Simultaneously with the cutting operation and as described above, the work strip 64 is advanced longitudinally in the guide 65 so that the strip is in the proper position for initiation of each succeeding cut.

On its outer side wall the guide 65 carries a shear block 71 which may be adjusted longitudinally of the wall by means of an adjusting screw 72. The block is adjusted so that its undersurface lies in close proximity to the plane 66 of the cutting edge 53 so that it may coact with said edge to insure a final clean shearing of the end section of the work strip. Any tendency of the blade to displace the chips laterally of the pockets may be neutralized, as in the previously described embodiment, by a guard strip 8 located in this case at the outer periphery of the conveyor in accordance with the direction of blade rotation, as illustrated in Fig. 10.

It will be apparent that the general mode of operation of this embodiment of the invention is the same as that of the embodiment illustrated in Figs. 1 to 4. In this case, however, the movements of the blade 49 and of the conveyor 61 are relatively timed so that a severed end section of the work strip, resulting from a complete rotation of the cutting blade, will be deposited accurately in one of the pockets 62 of the conveyor with successively severed end sections of the work entering successive pockets.

I claim:

1. In a cutting and depositing machine, a cutting blade and means for advancing said blade in a predetermined linear path, means for guiding work material into said path on a line intersecting the surface described by the cutting edge of the blade in said advance movement, said blade being of substantially uniform thickness and including rearwardly from said cutting edge with respect to the direction of said movement and toward the opposite side of said surface from the guide means so as to present to the terminal end of the work material projecting from the guide means an inclined camming surface behind the cutting edge tending to advance the material in the guide toward the path of the blade, and a conveyor movable unilaterally with the cutting edge of the blade and having a surface confronting said inclined blade surface containing a recess forming with the blade a pocket for the severed extremity of the work material, the bottom surface of the pocket parallelling the blade, and the distance of the blade from said bottom surface corresponding to the thickness of the severed extremity.

2. A machine according to claim 1 wherein the recess is V-shaped in cross section so as to provide an inner end wall for said pocket.

3. A machine according to claim 2 including means for discharging the severed sections of the work material from the pocket.

4. In a cutting and depositing machine, a cutting blade and means for moving said blade in a predetermined linear path, guide means for work material in which said material is freely movable into the path of the blade on a line intersecting the surface described by the cutting edge of the blade in the said movement of the latter, said blade inclining rearwardly from said cutting edge with respect to the direction of movement of the blade and toward the opposite side of said surface from the guide means and presenting to the terminal end of the work material projecting from the guide means an inclined surface behind the cutting edge operative to advance the work material in the guide simultaneously and progressively with the cutting operation whereby the said material is severed on a surface coinciding with the inclined surface of the blade and is simultaneously advanced behind the cutting edge to a predetermined extent into the path of the blade for a succeeding cutting operation, said blade being carried by a rotary member and constituting one of a series of like blades projecting generally in radial direction and in relatively spaced relation from the periphery of said member, a rotary conveyor member paralleling said blade-carrying member and having a peripherally disposed series of recesses movable successively into confronting relation with the respective blades in the area of said guide means to form pockets for reception of the severed sections of work material in the guide means, and said blades forming covers for the said pockets confining the said severed sections to the recesses.

5. A machine according to claim 4 wherein the blade-carrying and conveyor members are of differing diameters whereby the blades and recesses converge toward and diverge from the cutting station.

6. A machine according to claim 5 including means for successively discharging the severed sections from the recesses at a station remote to the cutting station.

7. A machine according to claim 6 wherein the discharge station is at least 180° removed from the cutting station as measured on the path of and in the direction of travel of the conveyor recesses.

8. In a machine for cutting sections of predetermined size from the end of a strip of work material, the combination with a rotary cutting blade whereof the cutting edge describes a spiral around the rotary axis of the blade and occupies a plane normal to said axis, said cutting edge forming the outer periphery of the blade and the blade body being inclined with respect to said plane, of means for directing said strip of work material into the path of said cutting edge at a point on said edge relatively near said axis and on a line normal to said blade.

9. A machine according to claim 8 wherein the spiral cutting edge embraces an angle in excess of 360°.

10. A machine according to claim 8 wherein the said guide means includes a shear element at the side thereof remote from said axis and having a working edge in proximity to the plane of the cutting edge and coactive with a segmental portion of said edge relatively remote from said axis to complete the severing of the work strip.

11. In a machine for cutting sections of predetermined size from the end of a strip of work material, the combination with a rotary cutting blade whereof the cutting edge describes a spiral around the rotary axis of the blade and occupies a plane normal to said axis, said cutting edge forming the outer periphery of the blade and the blade body being inclined with respect to said plane, of means for directing said strip of work material into the path of said cutting edge at a point on said edge relatively near said axis and on a line normal to said blade body, a conveyor underlying said blade for reception of the severed sections of the work strip, the surface of the conveyor confronting said blade being provided with a linear series of pockets, said pockets moving in a common path aligned with said work strip as directed to the cutting blade, and the bottoms of the pockets being parallel to the blade body at the point where the pocket is aligned with the work strip and in a common plane of intersection radial to the axis of cutter rotation, and means for operating said blade and conveyor in timed relation so that each rotation of the blade is accompanied by a movement of the conveyor to an extent corresponding to the separation of the adjoining pockets.

12. A machine according to claim 5 including guard means for confining the severed extremity against lateral displacement with respect to the conveyor in the area of said divergence.

References Cited in the file of this patent

UNITED STATES PATENTS

| | | |
|---|---|---|
| 1,069,580 | Rose et al. | Aug. 5, 1913 |
| 1,432,130 | Stukart | Oct. 17, 1922 |
| 1,909,029 | Walter | May 16, 1933 |
| 1,957,623 | Walter | May 8, 1934 |
| 2,193,147 | Stricker | Mar. 12, 1940 |
| 2,482,523 | Urschel et al. | Sept. 20, 1949 |
| 2,541,442 | Skoog | Feb. 13, 1951 |
| 2,711,275 | Bartlett | June 21, 1955 |
| 2,754,954 | Kaspar | July 17, 1956 |

UNITED STATES PATENT OFFICE

CERTIFICATE OF CORRECTION

Patent No. 2,861,610

November 25, 1958

Joseph Douglas Ramsay

It is hereby certified that error appears in the printed specification of the above numbered patent requiring correction and that the said Letters Patent should read as corrected below.

Column 1, line 67, for "1 and 4" read -- 1 to 4 --; column 5, line 45, for "including" read -- inclining --.

Signed and sealed this 7th day of April 1959.

(SEAL)
Attest:

KARL H. AXLINE
Attesting Officer

ROBERT C. WATSON
Commissioner of Patents